United States Patent
Craig (10) Patent No.: US 7,805,406 B2
(45) Date of Patent: Sep. 28, 2010

(54) CROSS-POPULATION OF VIRTUAL COMMUNITIES

(75) Inventor: Terrance Michael Craig, Mississauga (CA)

(73) Assignee: Xystar Technologies, Inc., Toronto, Ontario (*) Notice: Subject to any disclaimer, the term of this patent is extended or adjusted under 35 U.S.C. 154(b) by 394 days.

(21) Appl. No.: 11/977,030

(22) Filed: Oct. 22, 2007

(65) Prior Publication Data

US 2008/0104079 A1    May 1, 2008

Related U.S. Application Data

(60) Provisional application No. 60/855,011, filed on Oct. 27, 2006, provisional application No. 60/854,990, filed on Oct. 27, 2006, provisional application No. 60/855,133, filed on Oct. 27, 2006.

(51) Int. Cl.
*G06F 7/00* (2006.01)
*G06F 17/00* (2006.01)

(52) U.S. Cl. .................. 707/622; 707/636; 709/217

(58) Field of Classification Search ............. 707/1–10, 707/100–104.1, 200–206; 715/733–745, 715/753; 709/203, 217–219
See application file for complete search history.

(56) References Cited

U.S. PATENT DOCUMENTS

| | | | |
|---|---|---|---|
| 5,864,874 A | 1/1999 | Shapiro | |
| 6,549,217 B1 | 4/2003 | De Greef et al. | |
| 7,143,091 B2 | 11/2006 | Charnock et al. | |
| 2003/0028595 A1 | 2/2003 | Vogt et al. | |
| 2004/0034646 A1 | 2/2004 | Kimball et al. | |
| 2004/0088325 A1 | 5/2004 | Elder et al. | |
| 2005/0102358 A1 | 5/2005 | Gold et al. | |
| 2005/0159970 A1 | 7/2005 | Buyukkokten et al. | |
| 2005/0198031 A1 | 9/2005 | Pezaris et al. | |
| 2005/0198305 A1 | 9/2005 | Pezaris et al. | |
| 2005/0209999 A1 | 9/2005 | Jou | |
| 2005/0210409 A1 | 9/2005 | Jou | |
| 2005/0267766 A1 | 12/2005 | Galbreath et al. | |
| 2005/0278443 A1 | 12/2005 | Winner et al. | |
| 2006/0021009 A1 | 1/2006 | Lunt | |
| 2006/0080613 A1* | 4/2006 | Savant | 715/745 |

(Continued)

FOREIGN PATENT DOCUMENTS

EP    1 713 002    10/2006

(Continued)

OTHER PUBLICATIONS

Ho et al., Towards an evaluation methodology for the development of research-oriented virtual communities, Aug. 6, 2002, IEEE, 112-117.*

(Continued)

*Primary Examiner*—Jean B Fleurantin
(74) *Attorney, Agent, or Firm*—Carr & Ferrell LLP (57) ABSTRACT

Systems and method for cross-population of virtual communities are provided. An exemplary method comprises providing a plurality of virtual communities, each of the virtual communities related to other virtual communities by a cross-population relationship. A user associated with a first virtual community of the plurality of the virtual communities is provided access to a second virtual community of the plurality of the virtual communities based on a cross-population relationship between the first virtual community and the second virtual community.

18 Claims, 7 Drawing Sheets

U.S. PATENT DOCUMENTS

| | | |
|---|---|---|
| 2006/0121991 A1 | 6/2006 | Borinik et al. |
| 2006/0173838 A1 | 8/2006 | Garg et al. |
| 2006/0184997 A1 | 8/2006 | La Rotonda et al. |
| 2006/0218153 A1 | 9/2006 | Voon et al. |
| 2006/0218225 A1 | 9/2006 | Hee Voon et al. |
| 2006/0240856 A1 | 10/2006 | Counts et al. |
| 2007/0099701 A1 | 5/2007 | Simon et al. |
| 2007/0150603 A1 | 6/2007 | Crull et al. |
| 2007/0162570 A1 | 7/2007 | Mathur et al. |
| 2007/0183354 A1 | 8/2007 | Schuelke et al. |
| 2007/0208751 A1 | 9/2007 | Cowan et al. |
| 2007/0266097 A1 | 11/2007 | Harik et al. |

FOREIGN PATENT DOCUMENTS

| | | |
|---|---|---|
| WO | WO 01/08020 | 2/2001 |
| WO | WO 01/53970 | 7/2001 |
| WO | WO 2005/086502 | 9/2005 |
| WO | WO 2006/009383 | 1/2006 |
| WO | WO 2006/034384 | 3/2006 |

OTHER PUBLICATIONS

Risch et al., A virtual environment for multimedia intelligence data analysis, Aug. 6, 2002, IEEE, vol. 16, 33-41.*

* cited by examiner

FIG. 1

PRIOR ART

CROSS-POPULATION OF VIRTUAL COMMUNITIES

CROSS-REFERENCE

The present application claims the benefit of U.S. provisional patent application Ser. No. 60/855,011 filed Oct. 27, 2006 and entitled "Systems and Methods for Managing Privacy and Tracking of Community Members," U.S. provisional patent application Ser. No. 60/854,990 filed Oct. 27, 2006 and entitled "Cross-Population of Vertical Communities and Graphic User Interface for Navigating Between Vertical Communities," and U.S. provisional patent application Ser. No. 60/855,133 filed Oct. 27, 2006 and entitled "Systems and Method for Providing Content to Vertical Communities," the disclosures of which are incorporated herein by reference.

BACKGROUND

1. Field of the Invention

This invention relates generally to virtual communities and more specifically to cross-population of the members of two or more of the virtual communities.

2. Description of the Prior Art

There are multiple different virtual communities available online via the Internet or other communication networks. Created by an administrator, an individual user, or the like, a community represents an aggregation of users within the virtual social network who typically share something in common. A community is, therefore, generally directed toward a particular subject matter. Users with an interest in the subject matter may join the community and interact with other users with a similar interest. The subject matter may be, for example, social, hobby-related, fan-related, or business-related. A user may choose to create or join various communities corresponding with any of that user's interests.

Some examples of general interest virtual communities include AOL, MySpace, Friendster, Digg, and LinkedIn. Examples of special interest virtual communities include Scuba Board (scuba diving), Ars Technica (computing), Salon.com (technology and politics), Yelp (consumer reviews), match.com (online dating), and the like. Further, general interest websites, such as Yahoo!, may include community features such as discussion boards, personal media pages, and friend lists. Further, large online retailers, such as Amazon, may include product reviews, lists posted by customers, and so on. Blogs, such as Patently-O (patent law), may also have community features such as comment boards on which visitors can post comments.

Figure 1:
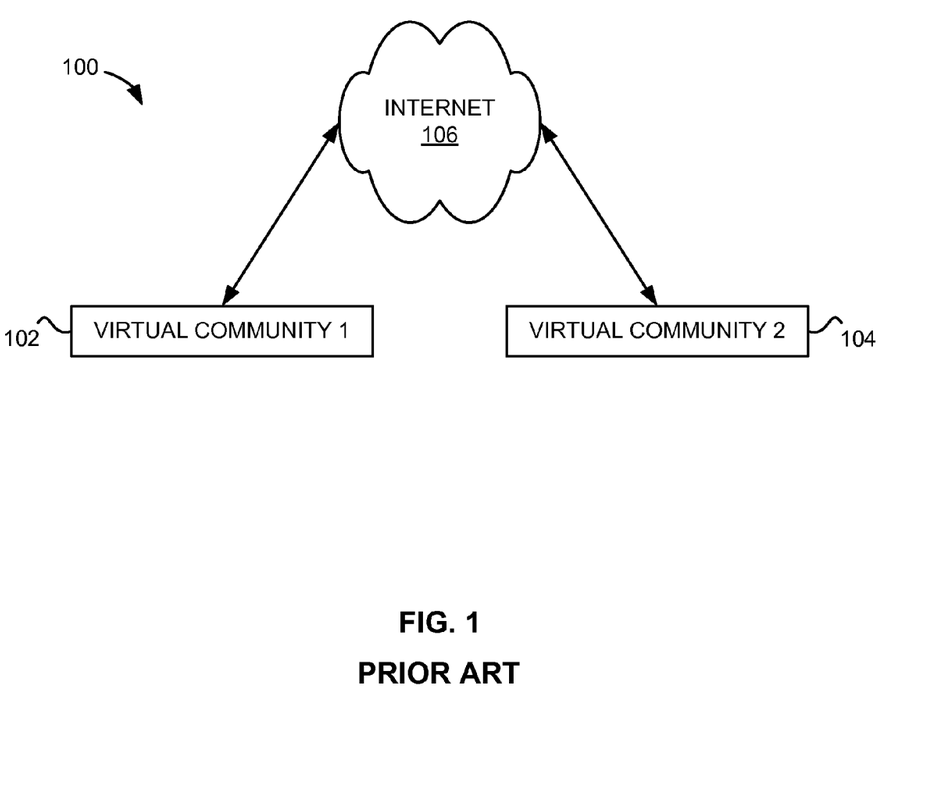
FIG. 1 is an illustration of two virtual communities according to the prior art.

FIG. 1 is an illustration of two virtual communities according to the prior art. A first virtual community 102 and a second virtual community 104 are separately accessible via the Internet 106. The first virtual community 102 operates independently from the second virtual community (i.e., has independent members, content, layout, and the like). For example, the first virtual community 102 may be a general virtual community, such as MySpace, and the second virtual community may be a special interest virtual community, such as Salon.com.

Often a person will be a member of more than one virtual community. For example, a person may belong to AOL, LinkedIn, and Ars Technica. Thus, a person may have separate profiles for each community. Further, the person may also regularly view, but not be a member of, other virtual communities. Currently, people must register separately for each virtual community and login separately to each virtual community. Further, people may not be able to find other virtual communities related to their interests.

SUMMARY

A system for cross-population of virtual communities comprises a communities module, a relationships module, and a profile module. The communities module is configured to provide a plurality of virtual communities, each virtual community comprising an activity module configured to provide access to content within the virtual community. The relationships module is configured to manage user access to the plurality of virtual communities based on relationships between each of the plurality of virtual communities. The profile module is configured to store a profile of each of the users.

A method for managing admission to a virtual community comprises providing a plurality of virtual communities, each of the virtual communities related to other virtual communities by a cross-population relationship, and providing a user associated with a first virtual community of the plurality of the virtual communities access to a second virtual community of the plurality of the virtual communities based on a cross-population relationship between the first virtual community and the second virtual community.

A method for cross-populating a virtual community comprises receiving login information from a user, the user associated with a profile and a first virtual community, displaying content associated with the first virtual community to the user, displaying content associated with a second virtual community to the user based on a cross-population relationship between the first virtual community and the second virtual community, and providing the user access to the second virtual community according to the profile of the user.

A method comprises generating a new virtual community, receiving a first cross-population relationship of the new virtual community with an existing virtual community, and providing a user of the existing virtual community access to the new virtual community based on the cross-population relationship.

DETAILED DESCRIPTION

The present invention includes systems and methods for cross-populating virtual communities. A virtual community is an aggregation, in an online environment, of content directed to a particular subject matter and associated with individuals that have an interest in that subject matter. The virtual community may comprise various interfaces configured to allow a member to access, generate, or modify content within the virtual community. Cross-population allows a member of one virtual community to join another virtual community through a single login process. Whether a member can cross-populate from one virtual community to another depends on a cross-population relationship between the virtual communities.

Each virtual community may be associated with a virtual community homepage that is accessed via a unique uniform resource locator (URL). The content within the virtual community, including personal pages and profiles of members, are linked together in a web-based presentation. The content within the virtual community can be both member-created as well as professionally developed, for example, by publishing companies or niche magazines. Content within the virtual community homepage may be tailored to the specific niche of that virtual community and may be further tailored to the member by geographic location, demographics and interests.

Within each community, members may interact in various ways, including interaction through activity modules. These activity modules may provide activity interfaces and include, for example, posting and responding to articles/news listings, blogs, event listings, photo/video, messages, and polls. Users may wish to write articles, blog entries, etc., and post them to a personal page, a community page, or the like, using one of the activity modules. In some embodiments, any community member can contribute content to any of the activity modules. Content may also be provided to community members through the various channels described in U.S. provisional patent application 60/855,133. In some embodiments, an activity module may be shared between two or more communities such that the user in one virtual community may access content in another virtual community without leaving the original virtual community.

Figure 2:
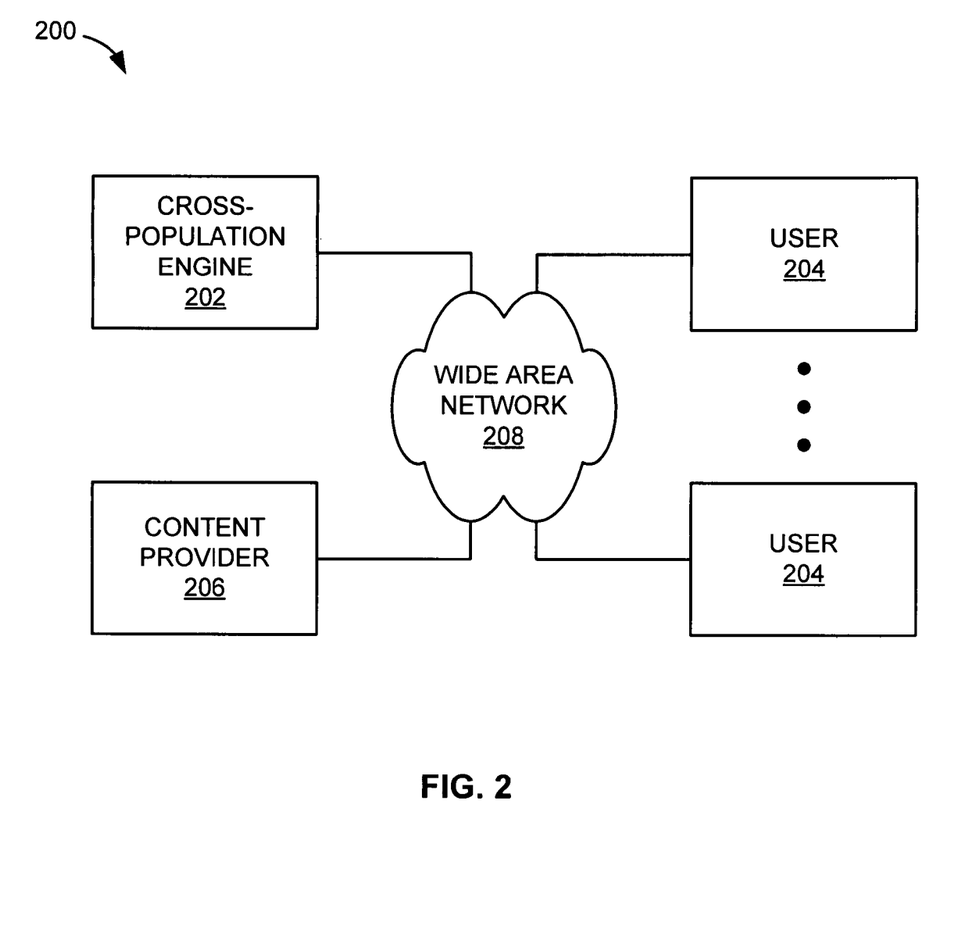
FIG. 2 is an illustration of an environment in which virtual communities may be cross-populated, according to an exemplary embodiment.

FIG. 2 is an illustration of an environment 200 in which virtual communities may be cross-populated, according to an exemplary embodiment. The environment 200 comprises a cross-population engine 202, a user 204, and a content provider 206 all configured to communicate via a wide area network 208. The environment 200 is configured to provide access to content and/or one or more virtual communities to the user 204. The environment 200 may be implemented in software and/or hardware and may comprise one or more computers, servers, router, or switches configured to communicate via the wide area network 208, as will be apparent to one skilled in the art.

The cross-population engine 202 is configured to provide access or otherwise coordinate access to one or more virtual communities to the user 204. In some embodiments, the cross-population engine 202 may generate a virtual community. Examples of virtual communities include fan-based (e.g., baseball, football, motor racing), owner-related hobbies or passions (e.g., motorcycle, classic car, boat owners) or business/professional (e.g., entrepreneurs, teachers, doctors). The term, "vertical community," may be used to refer to a virtual community having content that is directed to a specialty or niche of another virtual community.

A virtual community can include one or more activity modules that share a common theme relating to the niche of the virtual community. The activity modules include at least one activity interface configured to provide access to content within the virtual community to the user 204. For example, a physician community may include a Document Sharing activity module in order to provide research paper collaboration amongst peers. Likewise, a Rate My Ride (Car) activity module can be included in an automobile enthusiast virtual community, but would not be relevant to, and therefore not included in, the physician community. As discussed below, the cross-population engine 202 may implement relationships that dictate how the activity modules can be accessed via cross-population.

A user 204 that is not a member of any virtual community may join a first community based on an invitation and/or by filling out a complete profile. The user 204 may then join another virtual community from the first virtual community according to the relationships defined between the virtual communities.

The cross-population engine 202 is configured to provide cross-population relationships between the virtual communities to allow cross-population of the virtual communities. An exemplary set of relationships include mutually exclusive, mutually inclusive one-way and mutually inclusive two-way relationships. The mutually inclusive relationships provide for cross population of members from one virtual community to another while the mutually exclusive relationship prevents cross-population between virtual communities.

In some embodiments, the cross-population engine 202 maintains at least one profile associated with the user 204. Information concerning each user may be organized, stored, and managed by users through their respective user profiles. The profile comprises community access data associated with the user 204. The information within a profile is provided by the user 204 and/or collected based on the activities of the user 204. Information entered by the user 204 can include, for instance, personal information, personal descriptions, and interests. A user profile may further include information about the various activities and interactions involving the user 204 within the virtual social network.

The profile can be used to, for example, target content, including advertisements, to the user 204. In some embodiments, other users may access at least a portion of the user's profile according to the mutually inclusive relationships. The profile may also comprise access controls received from the user 204 to prevent other users (not shown) from viewing content generated by the user 204.

In some embodiments, the user 204 may be associated with a single primary profile and one or more secondary profiles. While the primary profile may comprise general information about the user 204 such as name, location, username, password, email address, or the like, secondary profiles may comprise information specific to one or more virtual communities. For example, a secondary profile associated with an automobile community may contain a picture and/or description of a car belonging to the user 204 while a secondary profile associated with a scuba community may comprise a log of dives that the user 204 has completed. In some communities, the user 204 may not provide information for a secondary profile.

The user 204 may be a member of more than one virtual community, and the profile associated with the user 204 can be tailored to each community of which he/she is a member. The user 204 may login to one virtual community and may then navigate to other virtual communities according to the cross-population relationships implemented by the cross-population engine 202 without having to log in again. Thus, the cross-population engine 202 may provide access to more than one virtual community based on a single login. In some embodiments, the cross-population engine 202 may select other virtual communities to invite the user 204 to join based on information in the user's profile and/or the relationships between the virtual communities the user 204 belongs to and the other virtual communities.

The content provider 206 may generate and/or locate content to be associated with one or more virtual communities. The content may comprise news articles, blog entries, photos, videos, audio recordings, or the like. In some embodiments, the content may also comprise advertisements. According to various embodiments, content may be provided based on a request from the user 204 and/or pushed to the user 204 based on a profile of the user 204.

Figure 3:
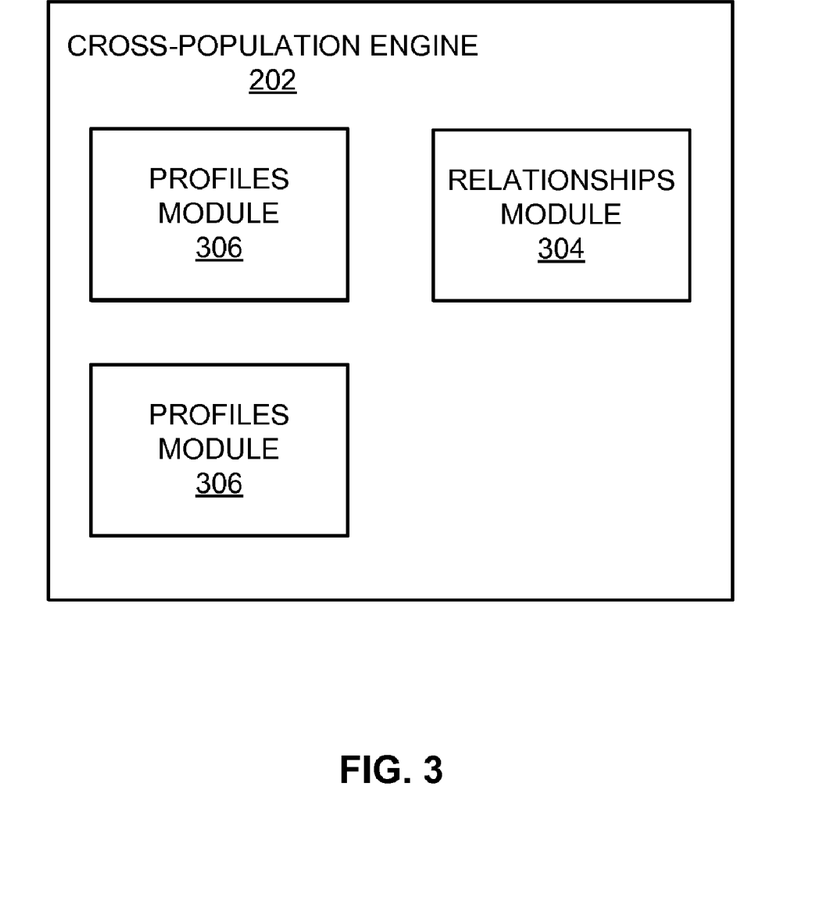
FIG. 3 is a block diagram of a cross-population engine, according to an exemplary embodiment.

FIG. 3 is a block diagram of the cross-population engine 202, according to an exemplary embodiment. The cross-population engine 202 may comprise a communities module 302, a relationships module 304, and a profiles module 306. In various embodiments the modules included in the cross-population engine 202 may be embodied in firmware, hardware, and/or software (stored on a computer readable medium) executable by a processor as is known to those skilled in the art.

The communities module 302 is configured to provide virtual communities and/or a cross-population interface for a user 204 to navigate between existing virtual communities. The cross-population interface may allow the user 204 to navigate between the virtual communities via tabs, links, menus, or the like. The communities module 302 is further configured to incorporate one or more activity modules into each of the provided virtual communities.

The relationships module 304 is configured to manage user access to the virtual communities based on the cross-population relationships between each of the communities identified by the communities module 302. The relationships module 304 may provide an interface to an administrator to allow the administrator to generate or modify the relationships. In one embodiment, the interface may comprise a listing of the other virtual communities and an indication of whether a mutually inclusive one-way relationship is defined between the virtual community and a selected virtual community. In some embodiments, the cross-population relationships are defined according to one or more business rules.

In some embodiments, the relationships module 304 also manages user access to the activity modules associated with each virtual community based on additional cross-population relationships associated with the activity modules themselves. Thus, an activity interface associated with the activity module may be displayed in a first virtual community and in a second virtual community.

The profile module 306 is configured to store and maintain a profile of each of the users 204. The profile module 306 may include one or more query interfaces for querying profiles of the users 204. For example, a query interface may be provided for a user 204 to query for other users. Another query interface may be provided for advertisers to query the user profiles to determine an appropriate audience to effectively reach customers.

Figure 4:
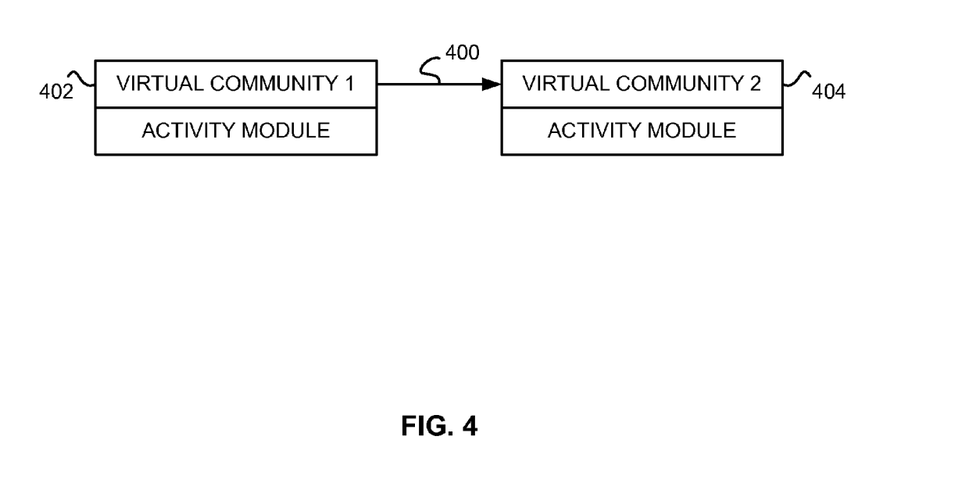
FIG. 4 is an illustration of a relationship between a first virtual community and a second virtual community, according to an exemplary embodiment.

FIG. 4 is an illustration of a one-way mutually inclusive relationship 400 between a first virtual community 402 and a second virtual community 404, according to an exemplary embodiment. According to the one-way mutually inclusive relationship 400, members of the first community 402 are allowed to view, join, and otherwise participate in the second community 404. The members of the second virtual community 404, however, cannot view, join, or otherwise participate in the first virtual community 402. The first virtual community 402 may be a sub-community of the second virtual community 404 or vice-versa. A sub-community is a virtual community that comprises content directed to a particular aspect of the particular subject matter associated with the original virtual community. When a member of the first virtual community 402 joins the second virtual community 404 according to the cross-population relationship, the primary profile associated with the member is updated to allow the member to access the second virtual community without a second login and/or without filling out a primary profile.

As an example, the first virtual community 402 may be an enthusiast-level community and the second virtual community 404 may be a fan-level community. More specifically, the first virtual community 402 may be targeted to owners of Le Mans racing teams, and the second virtual community 404 may be targeted to viewers of a television show about Le Mans racing teams. Because some advertisers, such as tool makers, wish to exclusively target owners of Le Mans racing teams, the enthusiast-level community provides a targeted audience. In contrast, other advertisers, such as a department store, may desire a more general audience. Thus, the second virtual community 404 allows the department store to advertise to more members, including the owners of the Le Mans racing teams who also belong to the second virtual community 404. Because of the one-way relationship 400 between the first virtual community 402 and the second virtual community 404, the value of the niche of the first virtual community 402 (e.g., the owners of the Le Mans racing teams) is preserved.

As another example, the first virtual community 402 may be a national business community and the second virtual community 404 may be a local chapter of the business community associated with a particular geographical area. Thus, to belong to the local chapter, members must also belong to the national business community. This one-way mutually inclusive relationship adds value to the national business community by requiring that members of the sub-community also join the parent community. To illustrate, the first virtual community 402 may be associated with certified psychiatrists. The second virtual community 404 may be a sub-community of psychiatrists in Manhattan. Thus, a national conference may place an advertisement in the first virtual community 402 while a museum in New York City may place an advertisement within the second virtual community 404.

A member of the first virtual community 402 may have a secondary profile associated with the first virtual community 402. If the member joins into the second virtual community 404, the secondary profile associated with the first virtual community is not displayed to other members of the second virtual community because of the one-way relationship 400. To further illustrate, if the member has a secondary profile associated with the second virtual community 404, other members of the first virtual community 402 may view both of the secondary profiles of the member.

Figure 5:
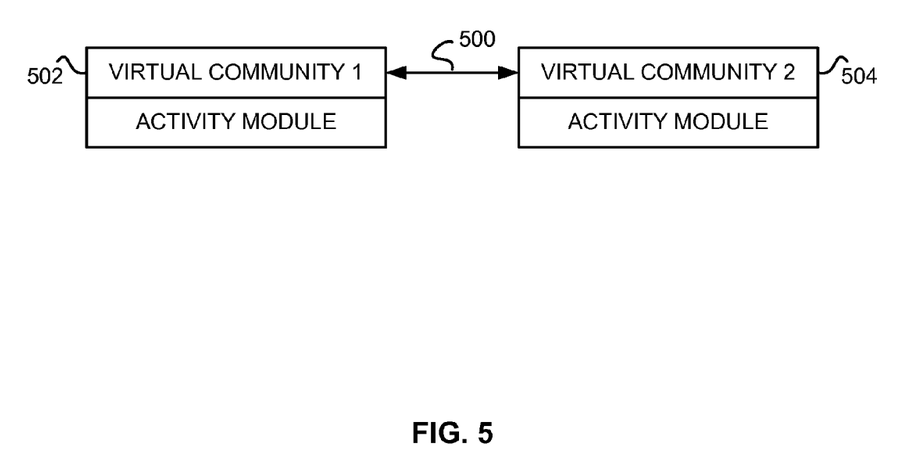
FIG. 5 is an illustration of a relationship between a first virtual community and a second virtual community, according to an exemplary embodiment.

FIG. 5 is an illustration of a mutually inclusive two-way relationship 500 between a first virtual community 502 and a second virtual community 504, according to an exemplary embodiment. If the virtual communities are related via a mutually inclusive two-way relationship 500, members of the first virtual community 502 may freely view, join, and otherwise participate in the second virtual community 504 and vice-versa. According to other embodiments, the relationship 500 may be implemented as a combination of two mutually inclusive one-way relationships 400 one of which defining a one-way relationship from the first virtual community 502 to the second virtual community 504 and the other defining a one-way relationship from the second virtual community 504 to the first virtual community 502.

While the members of the first virtual community 502 and the members of the second virtual community 504 may freely cross-populate, the first virtual community 502 and the second virtual community 504 remain distinct communities. Further, if a member of the first virtual community 502 joins the second virtual community 504, the member is not required to submit information for inclusion in a separate primary profile for the second virtual community 504. Rather, at least a portion of the information stored in the member's primary profile for the first virtual community 502 can be copied to the member's profile in the second virtual community 504.

A member of the first virtual community 502 may have a secondary profile associated with the first virtual community 502. If the member joins into the second virtual community 504, the secondary profile associated with the first virtual community is also displayed to other members of the second virtual community because of the two-way relationship 500. To further illustrate, if the member has a secondary profile associated with the second virtual community 504, other members of the first virtual community 502 may view both of the secondary profiles of the member.

Figure 6:
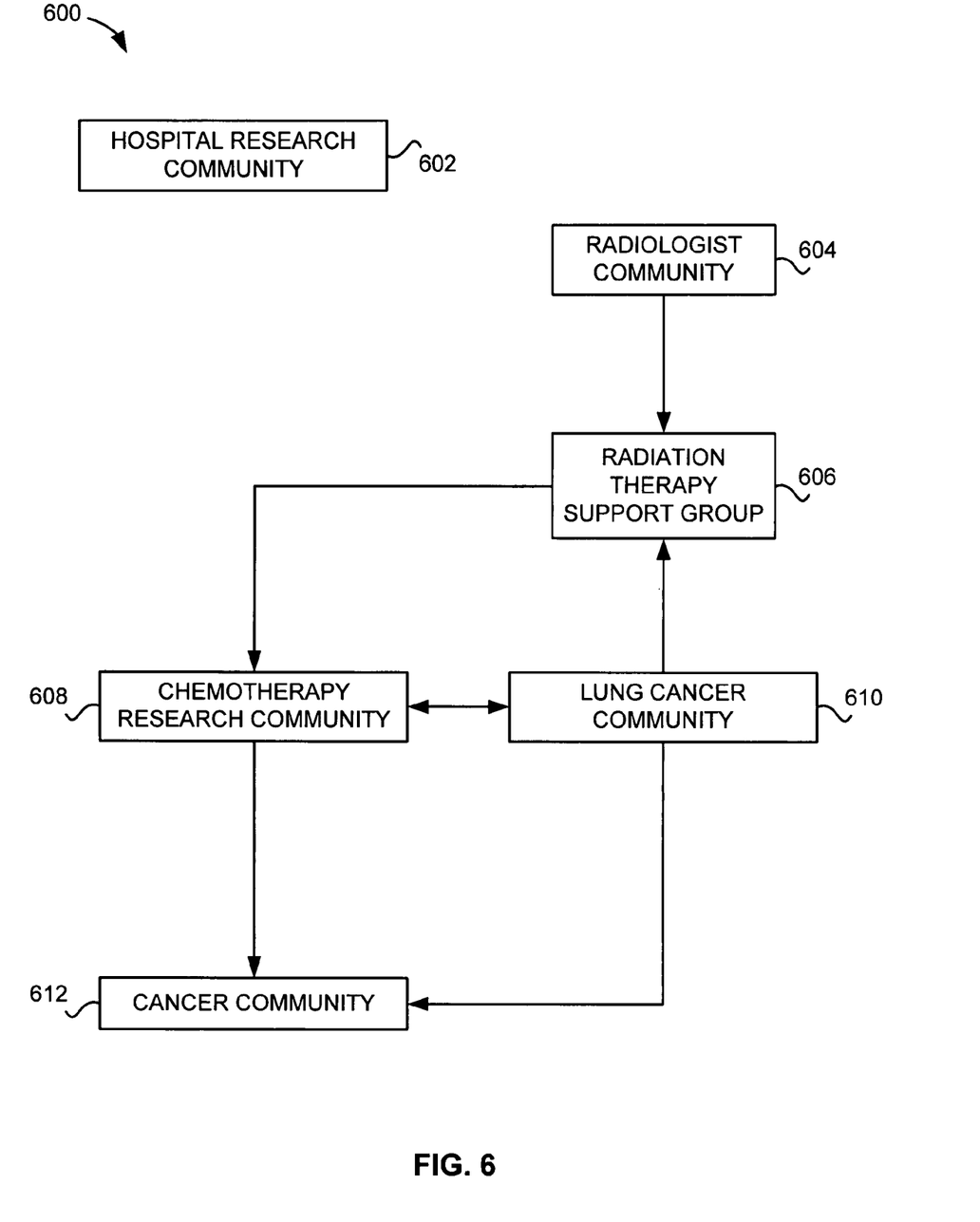
FIG. 6 is an illustration of a social network comprising a plurality of virtual communities, according to an exemplary embodiment.

FIG. 6 is an illustration of a social network 600 comprising a plurality of virtual communities, according to an exemplary embodiment. The social network 600 includes virtual communities related to one another according to the illustrated relationships. It is understood that the social network 600 is depicted merely for the purposes of illustration and is in no way meant to limit the scope of the disclosure.

An exemplary hospital research community 602 is related to the other virtual communities by a mutually exclusive relationship. The mutually exclusive relationship does not allow the members of the hospital research community 602 to interact with members of any other virtual community and vice-versa. In this respect, at least, the hospital research community 602 is similar to the prior art communities 102 and 104.

The hospital research community 602 may be mutually exclusive with respect to the other virtual communities, for example, to allow sharing of confidential information, maintain a narrowly focused community, and/or limit the membership of the community to a limited group of people. The mutually exclusive relationship, however, does not preclude a user 204 from being a member of the hospital research community 602 and another virtual community, but does prevent membership in the other virtual community by cross-population. In some embodiments, the user 204 may be required to login to the hospital research community 602 to access the community despite being already logged in to another community within the social network 600. Further, primary profile information of a member of the hospital research community 602 who is also a member of another community having cross-population relationships may not be shared with the other communities.

An exemplary radiologist community 604 may be directed towards radiologists as a business community. As such, membership in the radiologist community may be limited to licensed radiologists. The radiologist community 604 may have a mutually inclusive one-way relationship with a radiation therapy community 606. In some embodiments, the members of the radiation therapy community 606 may not be made aware that the radiologist community 604 exists.

In turn, the radiation therapy community 606 may have a mutually inclusive one-way relationship with an exemplary chemotherapy research community 608. The chemotherapy research community 608 may have a mutually inclusive two-way relationship with a lung cancer community 610.

According to the relationships discussed herein, the lung cancer community 610 may have a mutually inclusive one-way relationship with the radiation therapy community 606. The chemotherapy research community 608 and the lung cancer community 610 each have a one-way mutually inclusive relationship with a cancer community 612. Thus, the membership of the chemotherapy research community 608 will remain limited to those who have an interest in chemotherapy research, radiation therapy or lung cancer. Further, the membership of the lung cancer community 610 will remain limited to members who have an interest in lung cancer or chemotherapy research.

Figure 7:
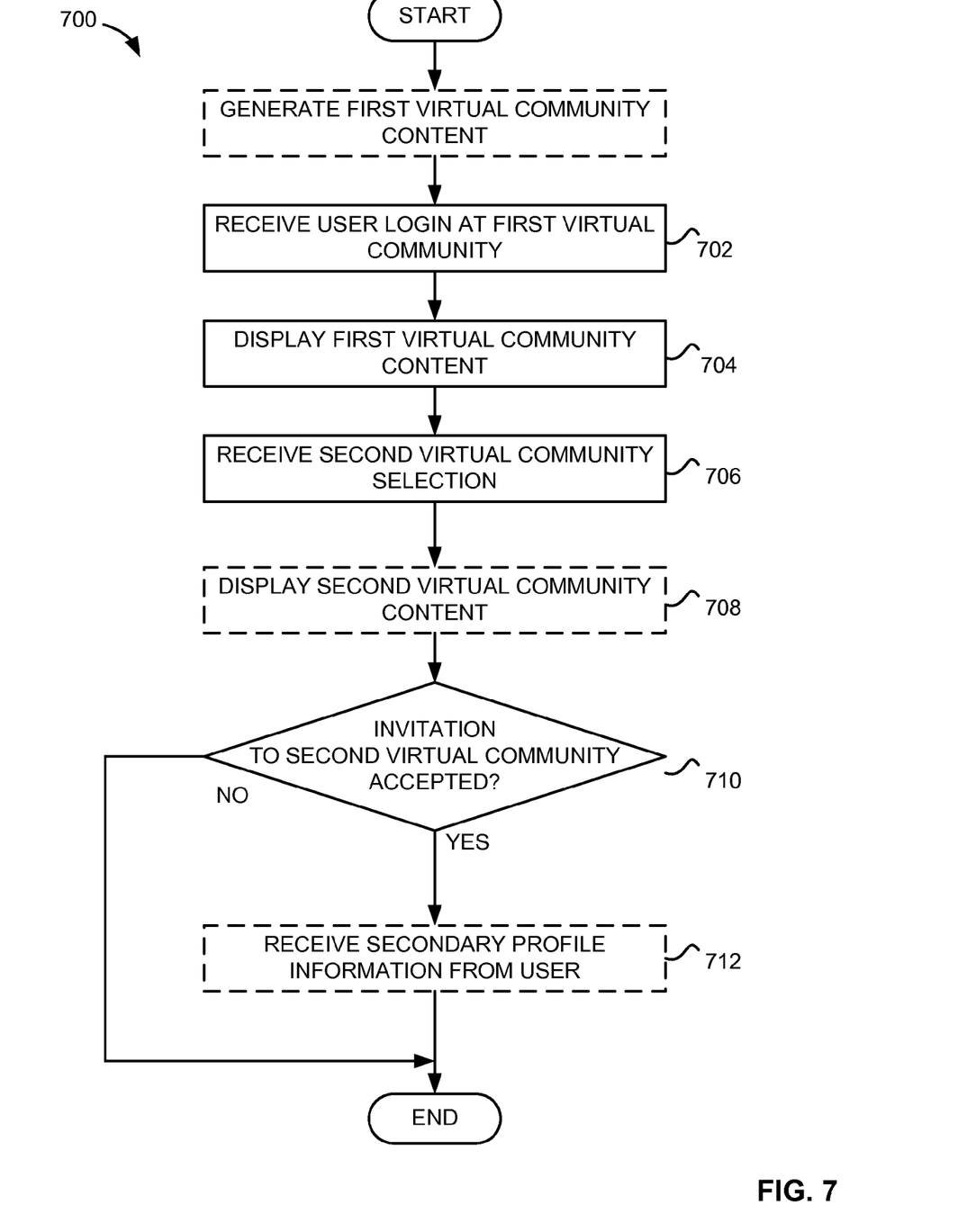
FIG. 7 is a flowchart illustrating an exemplary method for cross-populating virtual communities in a virtual social network.

FIG. 7 is a flowchart illustrating an exemplary method 700 for cross-populating virtual communities in a virtual social network. The method 700 allows a member of a first virtual community to navigate to and/or cross-populate into a second virtual community according to the cross-population relationship defined between the first virtual community and the second virtual community. Exemplary embodiments of the method 700 may be performed within the environment 200.

At a step 702, login information is received from a user, such as user 204, at the first virtual community by, for example, the cross-population engine 202 or via the Internet. The login information may comprise a user name and a password.

At a step 704, based on the login information, the first community is displayed to the user. According to some embodiments, at least a portion of the content in the first community may be selected to be displayed to the user by the cross-population engine 202 based on a profile of the user. If the first virtual community has a mutually inclusive relationship with the second virtual community, the members of the first virtual community are allowed to access the second virtual community via cross-population. The display of the first community may comprise a link to other communities having a mutually inclusive relationship with the first community and/or to which the user is already a member. According to some embodiments, the other communities may be listed according to whether the user is a member of the other communities.

At a step 706, a selection indicating a second community is received from the user. To facilitate the selection, the display may include a radio button, a tab, a link to the second community, a link to a secondary profile page associated with the second community, or an offer to receive an email including the invitation to join the second community. In response, the second virtual community is displayed to the user in a step 708.

If the user is not already a member of the second virtual community, a determination is made as to whether the user has accepted the invitation to join the second community in a step 710. The determination may be based on input received from the user. In some embodiments, the user may view the second community without joining the second community as a member. If the first virtual community has a mutually inclusive relationship with the second virtual community, the members of the first virtual community are allowed to access the second virtual community via cross-population.

If the first virtual community has access to the second virtual community based on the relationship there between, an interface for receiving secondary profile information within the second virtual community may be displayed to the user in an optional step 712. As part of accepting the invitation, the user may complete a partial questionnaire relating specifically to the second virtual community to generate a secondary profile within the second community.

To illustrate, if the first virtual community is directed towards Harley Davidson owners, the secondary profile of the user in the Harley Davidson community may comprise information about the user's motorcycle, road trips, or other relevant information. If the second virtual community is directed towards growing tomatoes, the secondary profile of users in the tomato growing community are likely to contain information such as pictures of the heirloom tomatoes grown by each user or whether the users prefer a specific type of fertilizer. Thus, to generate the secondary profile associated with the user in the tomato-growing community, a questionnaire about the user's tomatoes may be completed by the user cross-populating into the tomato growing community from the Harley Davidson community.

In some embodiments, the profile information of the user as viewed by other users is based on the cross-population relationships between the communities. In the above example, different information in the profile of the user may be displayed depending on the virtual community displayed. Further, other users or members of the community may be able to view the secondary profile information of the user associated with another community based on the cross-population relationship between the community associated with the profile information and the community in which the profile is viewed.

For example, if the Harley Davidson community and the tomato-growing community have a two way relationship, the profile information of the user associated with the Harley Davidson community and the profile information of the user associated with the tomato-growing community will be displayed to the other user. The Harley Davidson community, however, may have a one-mutually inclusive relationship with the tomato-growing community such that members of the Harley Davidson community may join the tomato-growing community but members of the tomato-growing community may not join the Harley Davidson community. In this instance, the members of the Harley Davidson community can view the user's profile information associated with the tomato-growing community. The members of the tomato-growing community will not be able to view the user's profile information associated with the Harley Davidson community.

In some embodiments, the profile information of the user may be organized by tabs according to the community associated with the information. For example, one tab may contain the information about the tomatoes grown by the user while another tab may contain the information about the motorcycle ridden by the user. In these embodiments, the tabs may be displayed based on the cross-population relationship between the communities.

The above-described functions can be provided as executable instructions stored on computer-readable storage media. Some examples of executable instructions are software, program code, and firmware. Some examples of storage media are memory devices, tape, disks, integrated circuits, and servers. The executable instructions are operational when executed by the processor to direct a processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for cross-population of virtual communities, the system comprising:
    a communities module stored in memory and executable by a processor to provide a plurality of virtual communities, each virtual community comprising an activity module configured to provide access to content within the virtual community;
    a relationships module stored in memory and executable by the processor to:
        manage user access to the plurality of virtual communities based on a cross-population relationship between the plurality of virtual communities, wherein the cross-population relationship allows a member of one of the virtual communities in the cross-population relationship to access another virtual community in the cross-population relationship, and
        provide the user with content from the first virtual community or from the second virtual community based on a niche of the first virtual community and a secondary profile of the user; and
    a profile module stored in memory and executable by the processor to store a profile of each of the users.

2. The system of claim 1 wherein the communities module is further configured to provide a second interface associated with other content within another virtual community.

3. The system of claim 1 wherein the activity module is configured to allow the user to modify the content within the virtual community.

4. The system of claim 1 wherein the communities module is further configured to provide a cross-population interface within each virtual community.

5. A method for managing admission to a virtual community, the method comprising:
    storing in memory information regarding a plurality of virtual communities, wherein a first virtual community of the plurality of virtual communities is related to at least one other virtual community by a cross-population relationship, wherein the cross-population relationship allows a member of one of the virtual communities in the cross-population relationship to access another virtual community in the cross-population relationship; and
    executing instructions stored in memory, wherein execution of the instructions by a processor:
        identifies that a user is associated with the first virtual community of the plurality of the virtual communities,
        identifies a cross-population relationship between the first virtual community and a second virtual community of the plurality of the virtual communities,
        grants the user access to the second virtual community of the plurality of the virtual communities based on the identified cross-population relationship between the first virtual community and the second virtual community, and
        provides the user with content from the first virtual community or from the second virtual community based on a niche of the first virtual community and a secondary profile of the user.

6. The method of claim 5 wherein the cross-population relationship between the first virtual community and the second virtual community comprises a one-way relationship.

7. The method of claim 5 wherein the cross-population relationship between the first virtual community and the second virtual community comprises a two-way relationship.

8. The method of claim 5 further comprising generating a first secondary profile of the user associated with the first virtual community and a second secondary profile of the user associated with the second virtual community.

9. The method of claim 8 further comprising allowing another user of the first virtual community to access the second secondary profile of the user.

10. The method of claim 5 wherein providing access to the first community includes receiving login information and providing access to the second community does not include receiving the login information.

11. The method of claim 5 wherein the second virtual community comprises a sub-community of the first virtual community.

12. A method for cross-populating a virtual community, the method comprising:
- receiving login information from a user, the user associated with a profile and a first virtual community; and
- executing instructions stored in memory, wherein execution of the instructions by a processor:
  - identifies that the user is a member of a first virtual community,
  - displays content associated with the first virtual community to the user,
  - displays content associated with a second virtual community to the user based on a cross-population relationship between the first virtual community and the second virtual community, wherein the cross-population relationship allows a member of one of the virtual communities in the cross-population relationship to access another virtual community in the cross-population relationship, and
  - provides the user with content from the first virtual community or from the second virtual community based on a niche of the first virtual community and a secondary profile of the user.

13. The method of claim 12 further comprising selecting the second virtual community based on the profile.

14. The method of claim 12 further comprising providing access to content within the first virtual community via an activity module.

15. The method of claim 12 further comprising determining whether to display the content within the first virtual community based on whether the user has access to the second virtual community.

16. A method comprising:
- storing information in memory regarding a newly generated virtual community;
  - receiving information regarding a first cross-population relationship of the new virtual community with an existing virtual community, wherein the first cross-population relationship allows a member of one of the virtual communities in the first cross-population relationship to access another virtual community in the cross-population relationship; and
  - executing instructions stored in memory, wherein execution of the instructions by a processor:
    - provides a user of the existing virtual community access to the new virtual community based on the received information regarding the cross-population relationship between the existing virtual community and the new virtual community, and
    - provides the user with content from the first virtual community or from the second virtual community based on a niche of the first virtual community and a secondary profile of the user.

17. The method of claim 16 further comprising:
- receiving a second cross-population relationship of the existing virtual community with the new virtual community; and
- providing a second user of the new virtual community access to the existing virtual community based on the second cross-population relationship.

18. The method of claim 16 further comprising providing a user interface including a menu indicating the new virtual community and the existing virtual community.

* * * * *